ROTARY APPARATUS

Original Filed Dec. 18, 1969 7 Sheets-Sheet 1

INVENTOR.
EDWARD T. SAYLOR, JR.

BY

Lemie, Edmonds, Morton, Taylor & Adams

ATTORNEYS

ROTARY APPARATUS

Original Filed Dec. 18, 1969 7 Sheets-Sheet 2

INVENTOR.
EDWARD T. SAYLOR, JR.

BY

Pennie, Edmonds, Morton, Taylor & Adams

ATTORNEYS

INVENTOR.
EDWARD T. SAYLOR, JR.

BY

Pennie, Edmonds, Morton, Taylor & Adams

ATTORNEYS

INVENTOR.
EDWARD T. SAYLOR, JR.

BY

Pennie, Edmonds, Morton, Taylor & Adams

ATTORNEYS

INVENTOR.
EDWARD T. SAYLOR, JR.

BY

Pennie, Edmonds, Morton, Taylor & Adams

ATTORNEYS

ROTARY APPARATUS

Original Filed Dec. 18, 1969 7 Sheets-Sheet 6

INVENTOR.
EDWARD T. SAYLOR, JR.

BY

Pennie, Edmonds, Morton, Taylor & Adams

ATTORNEYS

INVENTOR.
EDWARD T. SAYLOR, JR.

BY

Pennie, Edmonds, Morton, Taylor & Adams

ATTORNEYS

United States Patent

Re. 28,444

Reissued June 10, 1975

28,444

ROTARY APPARATUS

Edward T. Saylor, Jr., 789 E. Glen Ave., Ridgewood, N.J. 07450

Original No. 3,595,018, dated July 27, 1971, Ser. No. 886,421, Dec. 18, 1969, which is a continuation-in-part of application Ser. No. 687,947, Nov. 9, 1967, now Patent No. 3,485,174. Application for reissue May 11, 1973, Ser. No. 359,237

Int. Cl. F01b *13/06;* F02b *57/08;* F02g *3/00*

U.S. Cl. 60—39.61 11 Claims

Matter enclosed in heavy brackets [ ] appears in the original patent but forms no part of this reissue specification; matter printed in italics indicates the additions made by reissue.

ABSTRACT OF THE DISCLOSURE

[Various configurations of rotary engines, including internal combustion] *A rotary gas compression apparatus is disclosed and specifically configurations of* rotary engines are disclosed *including internal combustion rotary engines* wherein pressure exerted by the motive gas is transmitted by means of an intermediate liquid against the outer eccentric casing, thus causing relative rotary movement between the casing and a central rotor.

This invention is a *reissue of U.S. Pat. No. 3,595,018* which is a continuation-in-part of [our copending] U.S. Pat. application entitled "Apparatus for Transferring Energy from a Gas to a Liquid" filed Nov. 9, 1967 and bearing Ser. No. 687,947, U.S. Pat. No. 3,485,174.

BACKGROUND OF THE INVENTION

In the [copending] *prior* case, there was shown an apparatus in the form of a rotary pump which comprised flowing together a gas and a liquid at the same velocity within portioned cells, increasing the volume of the portioned cells to allow the gas to expand to produce work against the liquid as the liquid is allowed to escape from the cells.

SUMMARY OF THE INVENTION

The present invention [comprises rotary engine configurations each of] *is a rotary gas compression apparatus* which basically includes an eccentric outer casing and a rotor internally mounted for relative rotation with respect to the casing, the rotor having vanes which define peripherally located cells about the circumference of the rotor and means for introducing *a gas* into each of the cells [a motive gas]. Each cell further includes liquid circumferentially located adjacent to the outer casing and in several embodiments, pistons separate the liquid from the [motive] gas which is introduced internally of the rotor to flow into radially inward portions of the cells.

Various means are provided in different configurations for introducing [motive] *a* gas into the aforementioned cells during a rotary segment of movement and for exhausting such gas thereafter. Such means comprises poppet valving and cams controlling movement thereof; or, alternatively, various porting arrangements are shown. The engine may be of the internal combustion type having conventional spark plugs or may be indirectly powered by a remote [internal] combustion source.

*In one form of the apparatus, gas so introduced into selected sequentially related cells is compressed and in a compressed state is exhausted from the casing. Thus, at this point the apparatus of the invention acts as a compressor. In a particular application and embodiment of this principle, the gas is conducted in its compressed state externally of the casing to a combustor wherein fuel is added, the gas being ignited and then returned to another sequentially selected series of cells where the motive power of the ignited gas is used to exert relative motion between the casing and wheel.*

*The same principle is applied in another configuration except that air and fuel are compressed in a first series of cells and are ignited within the casing in a second selected series of cells to drive the wheel relative to the casing.*

*These and other specific aspects of the invention will be understood by making reference to the following specification and the accompanying drawing.*

DESCRIPTION OF PREFERRED EMBODIMENTS

Figure 1:
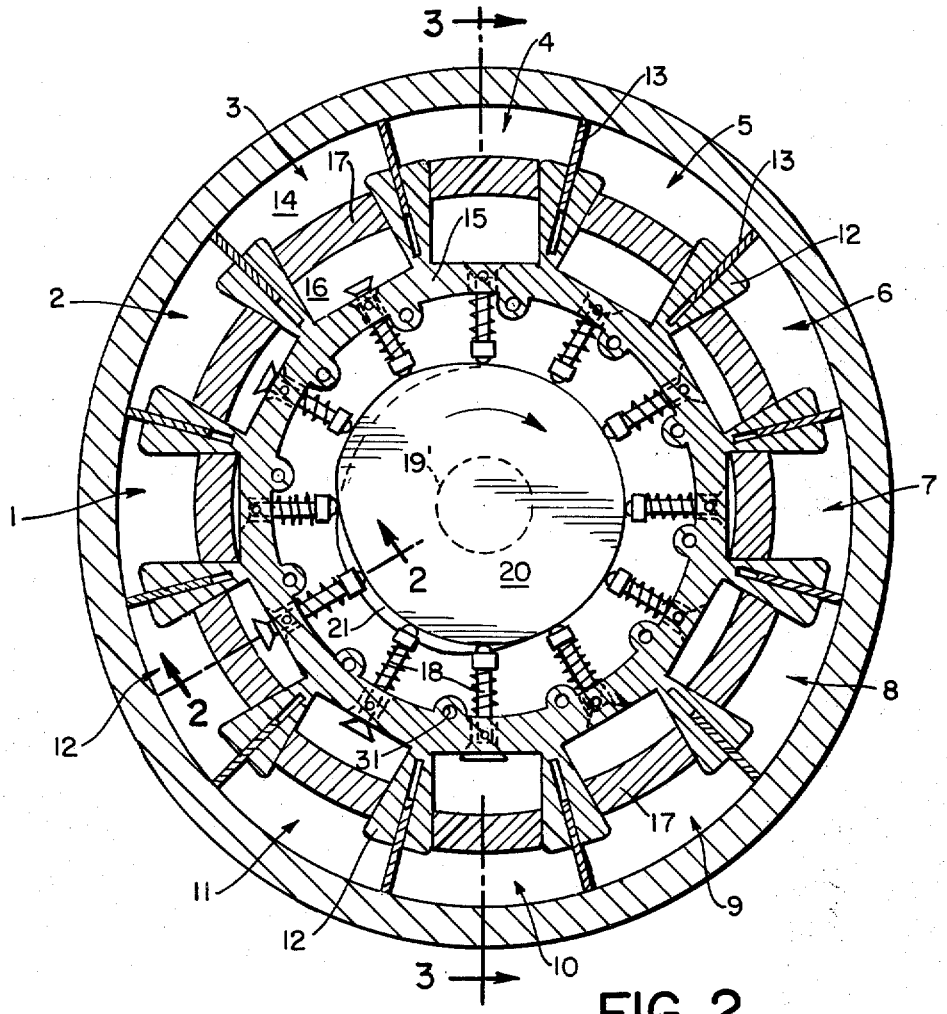
FIG. 1 is a cross-sectional view of one form of rotary engine according to the invention which includes spark plugs and cam actuated exhaust and intake valving.
Figure 2:
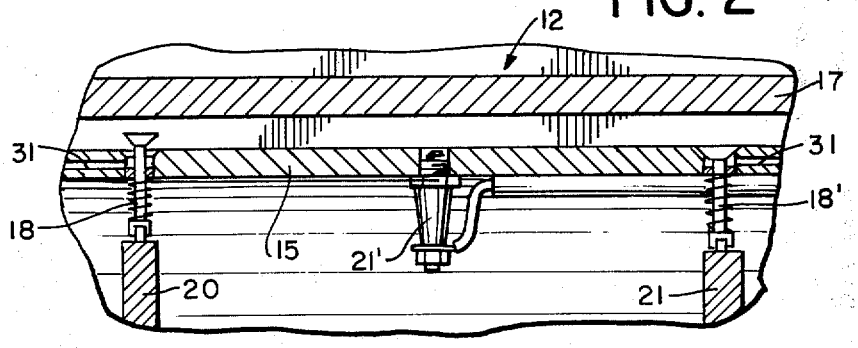
FIG. 2 is a fragmentary cross-sectional view taken along lines 2—2 of FIG. 1.

Referring to the drawings and initially to FIGS. 1–5 thereof, a rotary internal combustion engine 10 incorporating the principles of the present invention has been illustrated. Engine 10 has an outer casing 11 which is eccentric for a reason which will be explained. Located within the casing [10] *11* in sealed relation thereto is a *circular vaned wheel or* rotor 15 having radially outward sections 12. Each of the sections 12 is slotted to hold a plurality of vanes 13. Each of the vanes is spring loaded outwardly toward the casing 11 and during relative rotation between the rotor and casing, will provide sliding sealing contact.

The sections 12, together with the vanes 13, define a plurality of compartments or cells having upper portions 14 and radially inwardly portions 16. Separating the two portions of the compartments are pistons 17 which are each in sliding sealing contact with the opposing sides of adjacent rotor sections 12 and may, though not necessarily, be in sealing contact therewith. In some instances the material of the pistons 17 may be of such density as to "float" at the interface between the outer liquid and inner motive gas.

For purposes of illustration, and in further describing intake and exhaust cycles, the rotary engine of FIG. 1 has been depicted as having station segments 1–12, segments 1–4 comprising 90° of rotation, 1–8 180°, etc. As shown, each of the upper compartments sections 14 are filled with a liquid, for example, water or hydraulic fluid. In order to produce relative movement between the rotor and casing, a pressure or motive fluid will be introduced sequentially into each of the compartments 16 which will have the affect of driving the pistons 17 outwardly toward the casing 11. *Casing 11 in cross section is shaped generally as an ellipse whereas the shape of the rotor 15 is generally that of a cylinder, the axes of casing and rotor being coaxial.* During such movement of the pistons, the liquid in each compartment section 14 will be under a pressure substantially equal to the pressure beneath the respective pistons and such pressure will be distributed against the inner surface of the casing 11, against inner surfaces of each adjacent vane 13, and against the interior rotor sections 12. It will be observed that due to the eccentricity of the outer casing 11 *with respect to rotor 12*, that in each compartment sections 14, pressure will be unevenly exerted against the different lengths of adjacent vanes 13, since in each case, the casing will be closer to the center of rotation with respect to one of the vanes and further away with respect to the next adjacent vane. In the case of the illustrated embodiment of FIG. 1, such pressure unbalance will cause the rotor 15 to rotate in the direction of the arrow at such times when the pison exerts pressure against the liquid intermediate pistons and the casing 11. This action will now be further explained as follows:

In the embodiment of FIG. 1, a four cycle internal combustion engine has been illustrated. Accordingly, a fuel air mixture is introduced into compartment sections 16 (by a means which will be further described) beginning, for example, at station 1 and continuing through station 4, *at which station the volume of compartment section 16 is at a maximum.* Thereafter, continued rotation of the rotor 15 relative to the casing will cause the fluid trapped in each of the respective upper compartment sections 14 to force the pistons 17 radially inwardly through stations 4–7. At station 7, the fuel air mixture will achieve maximum compression and the mixture will be fired by means to be described so that the pistons 17 will be driven outwardly exerting pressure against the liquid in the upper compartments 14. It will be noticed that due to the eccentricity of the casing in respect to each of the successive stations 7–10, that a greater reaction force is felt against one of the vanes 13 defining each compartment section 14 such that relative rotation of the rotor 15 with respect to the casing 11 will result. Thus from stations 7–10 movement of the pistons outwardly will result in power being transmitted to the rotor to cause its rotation.

From stations 10–1, again the eccentricity of the casing 11 causes each piston 17 to be driven radially inwardly in order to exhaust the expanded gases.

Figure 3:
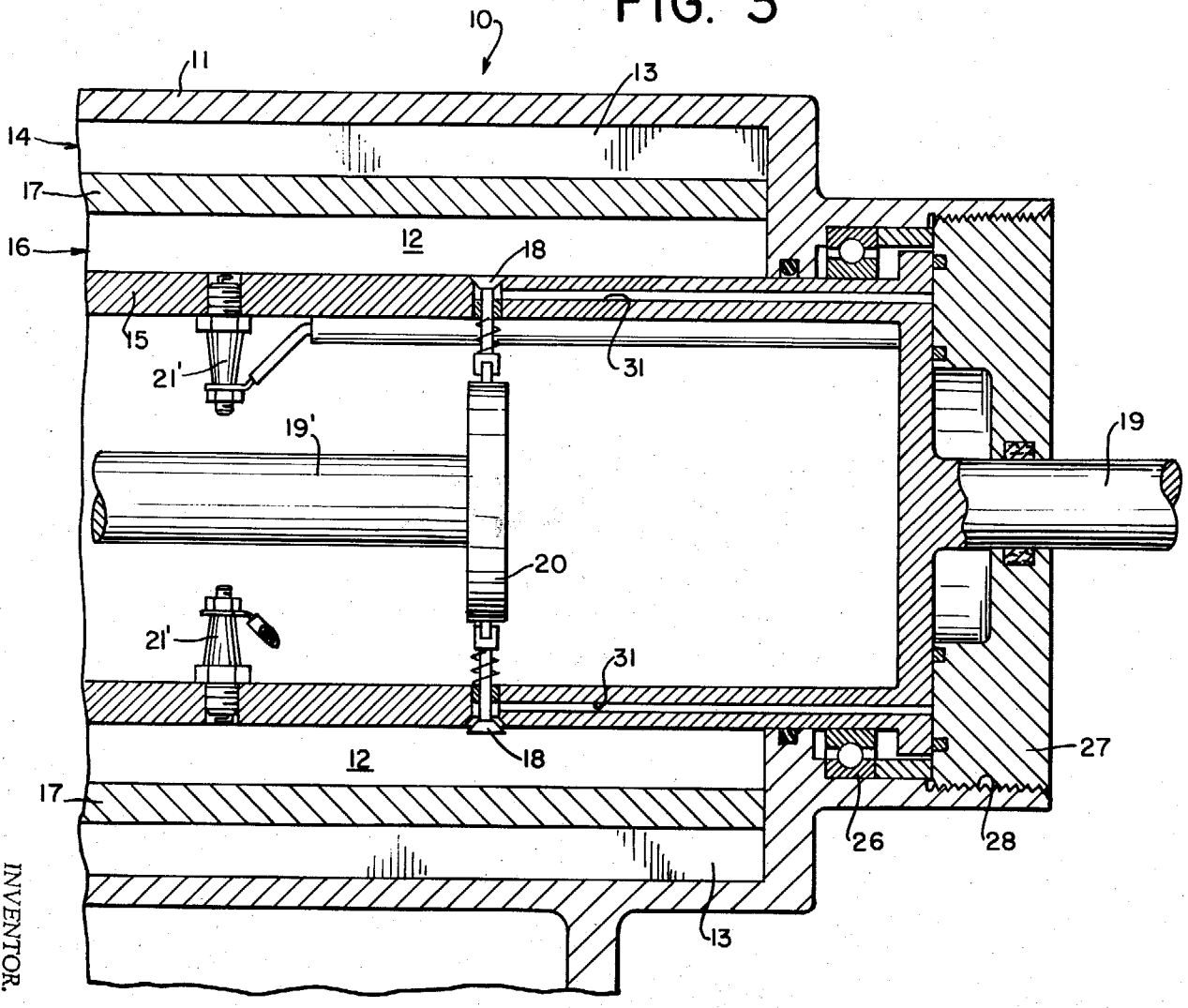
FIG. 3 is a cross-sectional view taken in the direction of arrows 3—3 of FIG. 1.
Figure 4:
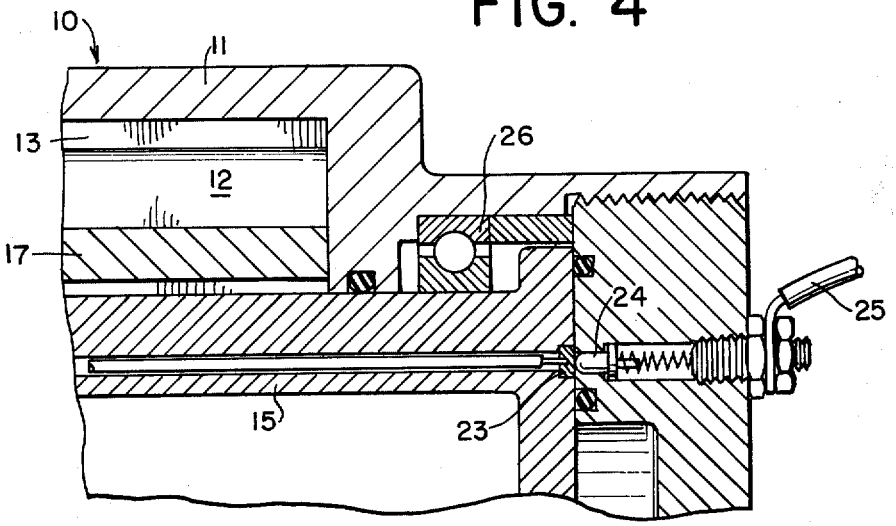
FIG. 4 is a fragmentary cross section of an end portion of the engine of FIG. 1.

In order to accomplish the foregoing cycle, in association with each lower compartment 16 are intake and exhaust poppet valves 18 and 18' which are associated with cams 20 and 21 for causing sequential opening and closing of the valves in a known manner. Furthermore, as best show in FIGS. 3 and 4, there are provided spark plugs 21 which are electrically connected through suitable lead wiring [in] respective each to contact *terminals* [terminal] 23 at the end of the rotor 11. The contact 23 will receive a high voltage impulse from the terminal 24 which is connected by a lead 25 to an induction coil. Rotary support between the rotor 15 and casing 11 is effected by roller bearings 26 which circumferentially encompasses the end of the rotor 15. The rotor develops power which is delivered to shaft 19. Shaft 19' is fixed by a suitable means to the casing 11 and support cams 20 and 21 in fixed relation to the rotor. The opposite end of the rotor will also be arranged similarly with respect to the outer casing 11. As shown in FIG. 4, a provision of an end plate 27 which is threaded internally to the casing 11 at 28 is provided.

Figure 5:
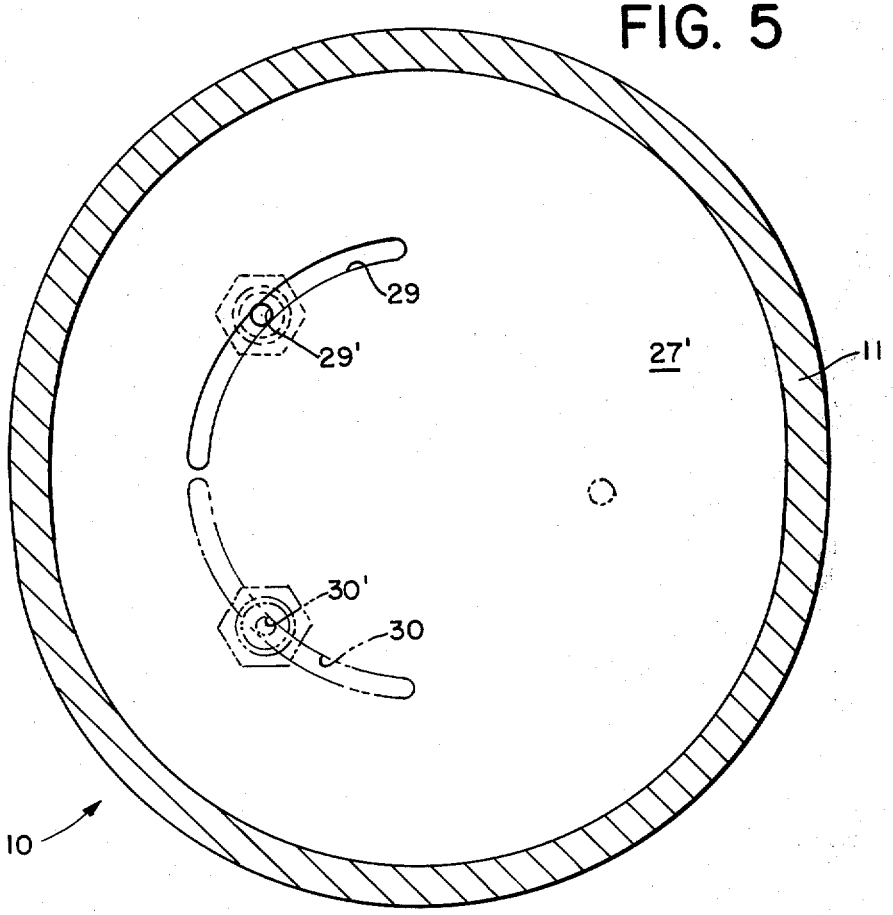
FIG. 5 is a cross section showing the arrangement of exhaust and intake parts used in conjunction with the engine of FIG. 1.

FIG. 5 is a transverse sectional view of one form or arrangement whch may be provided for permitting intake and exhaust to each of the compartments [14] *16*. The view shown in FIG. 5 is of the casing 11 at the opposite end of or relative to that shown in FIG. 4. Accordingly, as illustrated diagrammatically, the end plate closing the opposite end of the engine will be provided with intake slot 29 and as shown in phantom the opposite end will have an exhaust slot 30. As seen in FIG. 3, each of the poppet valves 18 and [19] *18'* have logitudinal passages 31 which connect up with the slots 29 and 30 during prescribed angular travel of the rotor relative to the end plates 27'. The slots 29 and 30 are in turn appropriately connected to passages 29' and 30' for the introduction of fuel air mixture during the intake portion of the cycle and for the exhaust of gases during the exhaust portion of the cycle.

Figure 6:
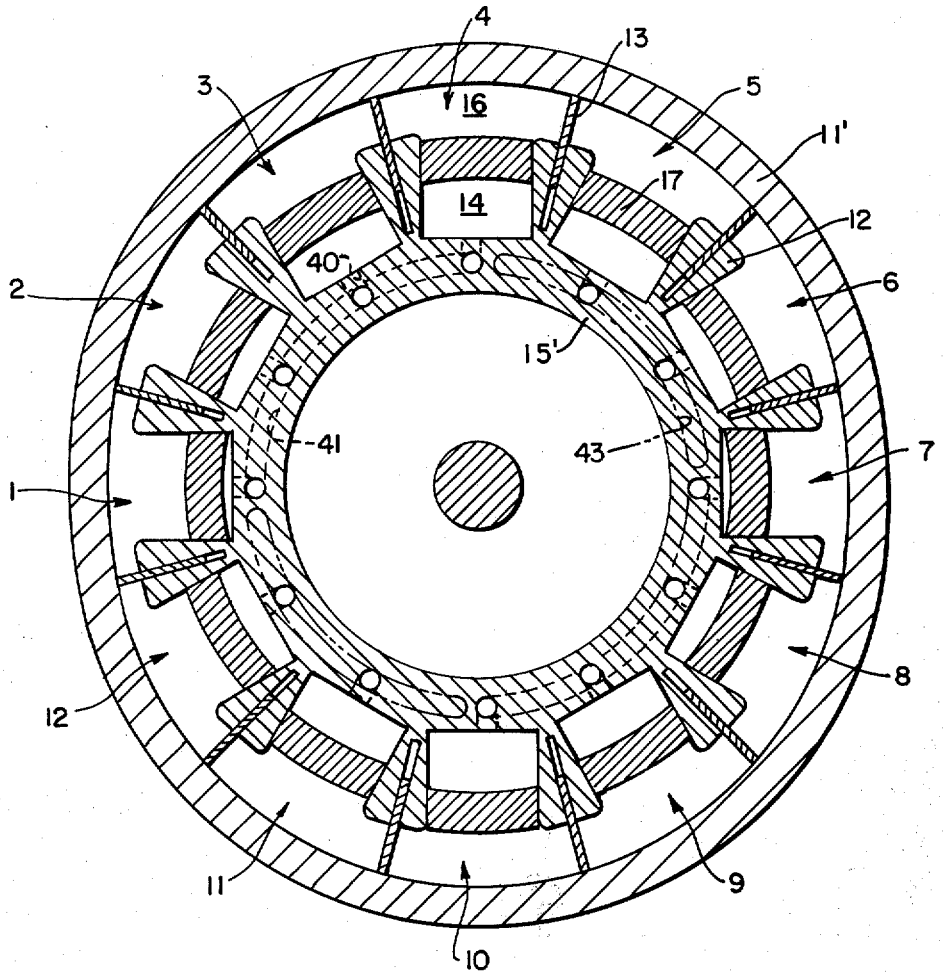
FIG. 6 is a second embodiment of rotary engine utilizing the injection of a motive gas such as steam to obtain power.

Referring to an alternate embodiment illustrated in FIG. 6, the engine shown is one which might be powered by the introduction thereto of a high-pressure fluid which is steam, for example, for an external steam generation source. The principle of operation is essentially similar to that of the engine shown in FIGS. 1–5 except for modifications attendant upon the fact that the fluid engine is not internally fired. Accordingly, ports 40 are provided to each of the lower compartments 14 and which serve the dual function of intake and exhaust. It will be understood that as the rotor 15' rotates relative to an end plate such as has been shown in FIG. 9, high-pressure steam will first be admitted via conduit 50 to the slot 41 and therefrom through passage 45 into compartments 14'. As illustrated, the slot 41 may be connected to a suitable external source of steam pressure and will admit steam into the respective compartments 14 to positions 1–4 thereby producing power by forcing the pistons 17 against a liquid intermediate of the pistons outer casing 11'. Thereafter, through continued rotation of the rotor 17', the expanded steam will exhaust through that portion of the cycle represented by positions 4–7. For this purpose the end cap 27' will be provided with a slot 43 which will suitably come into registry with the ports 41 and which will permit the exhausted steam to escape. A similar intake and exhaust cycle will occur through 180° of rotation of the rotor relative to the casing as represented by positions 7–1.

Figure 9:
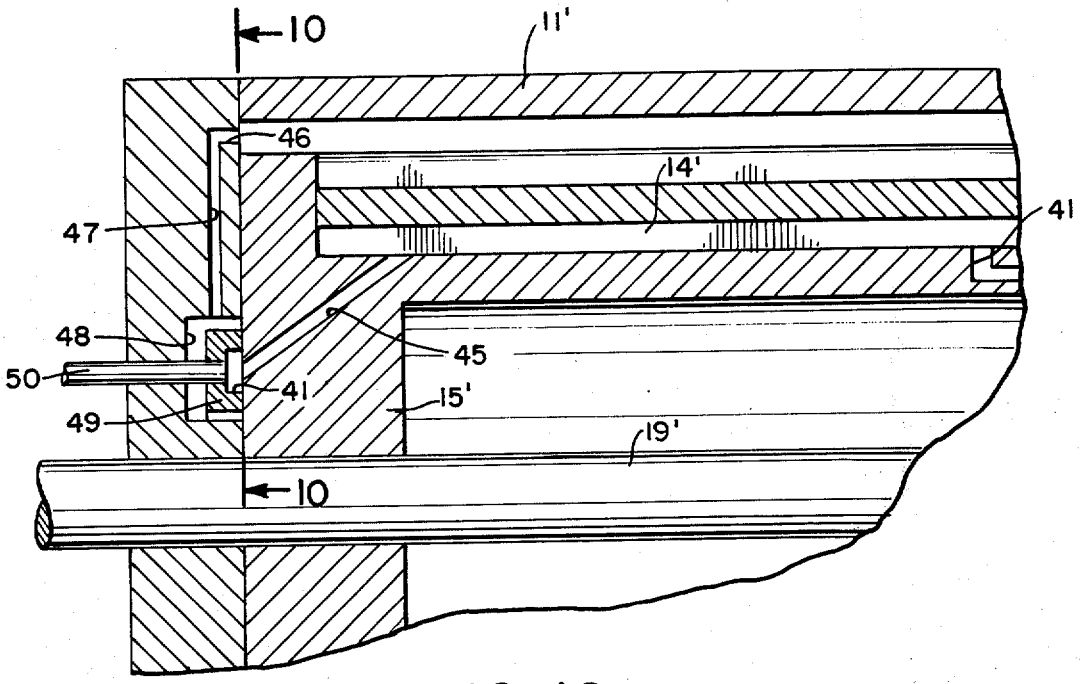
FIG. 9 is a cross section showing a sealing arrangement between the end plate and rotor which may be used in conjunction with the engine of FIG. 7; and, FIG. 10 is a view taken in the direction of the arrows 10—10 of FIG. 9.
Figure 10:
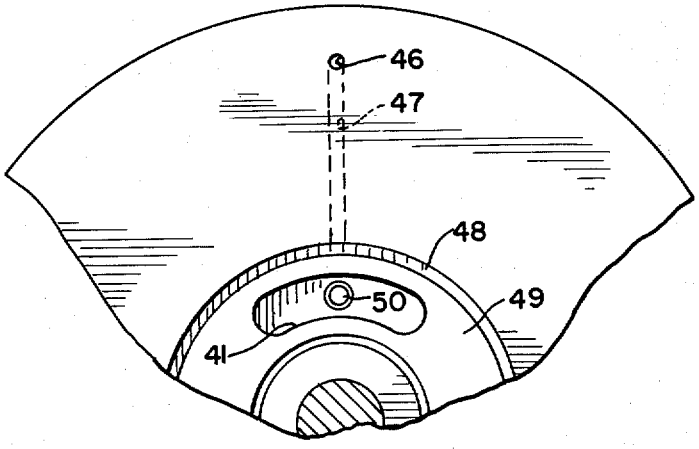

With further reference to FIG. 9, there has been illustrated one means for providing sealing of the representative slots 41 etc. against the rotor 15'. Pressure fluid will flow from adjacent the outer casing 11' through the passages 46, 47 and 48 surrounding the manifold ring 49 which defines the slot 41. The slot 41 is connected to intake or exhaust as the gas comes through tube 50. Consequently, the working pressure of the engine will be reflected upon the manifold member 49 to hold such member effectively sealed against the face of the rotor 15.

Figure 7:
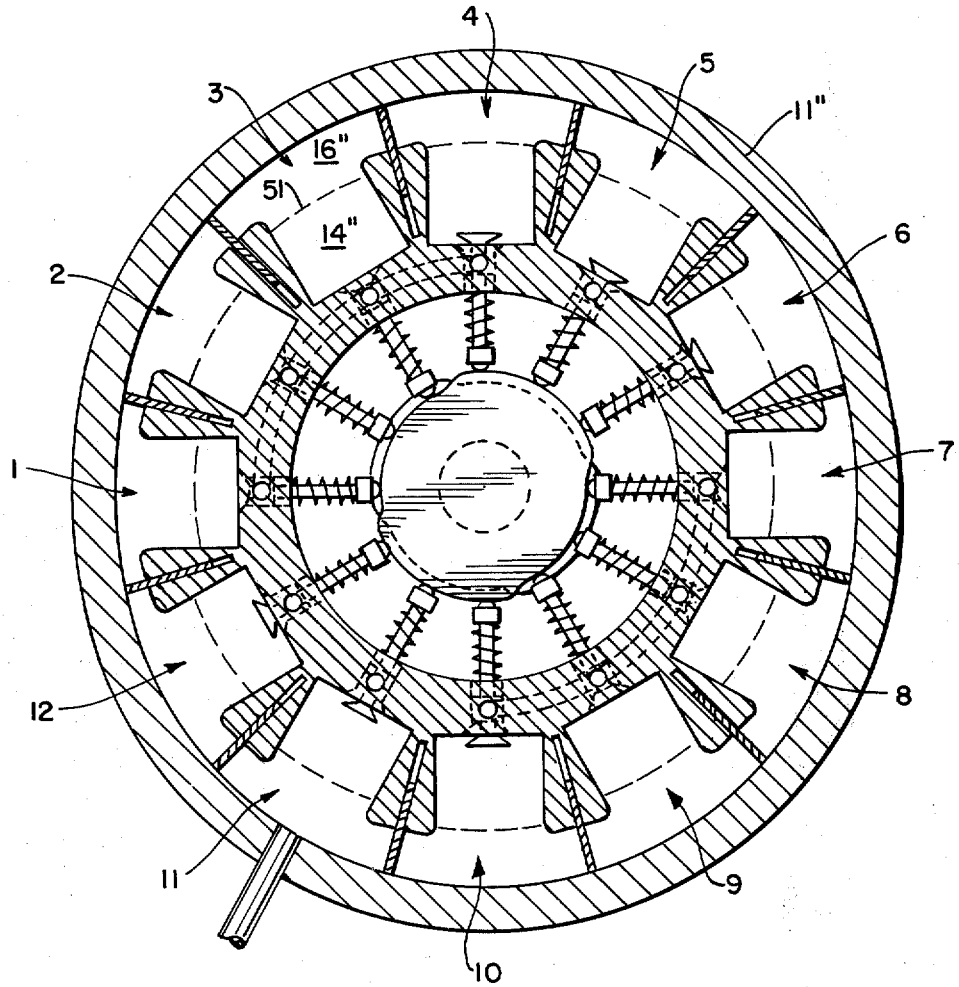
FIG. 7 is a third embodiment of rotary engine according to the invention wherein pressure is exerted by the motive gas acting through a gas/liquid interface.

Referring next to FIG. [8] *7*, yet another configuration of rotary engine has been illustrated which again employs cammed poppet valves for intake and exhaust. The arrangement is similar to that shown in FIG. 1 except that the engine of FIG. 7 is not internally fired. Rather, a gas under pressure will be admitted to the engine through the respective ports 41'. No pistons are provided but rather gas admitted under pressure to each of the compartment sections 14'' will effect a gas liquid interface 51. Although some mixing of gas and liquid may be expected, nevertheless centrifugal [amount] *force* will tend to maintain the liquid more or less adjacent to the outer casing 11'' and the effect of the gas pressure in compartment 14'' will be felt through the liquid against the casing to cause relative rotation between the rotor and casing.

Figure 8:
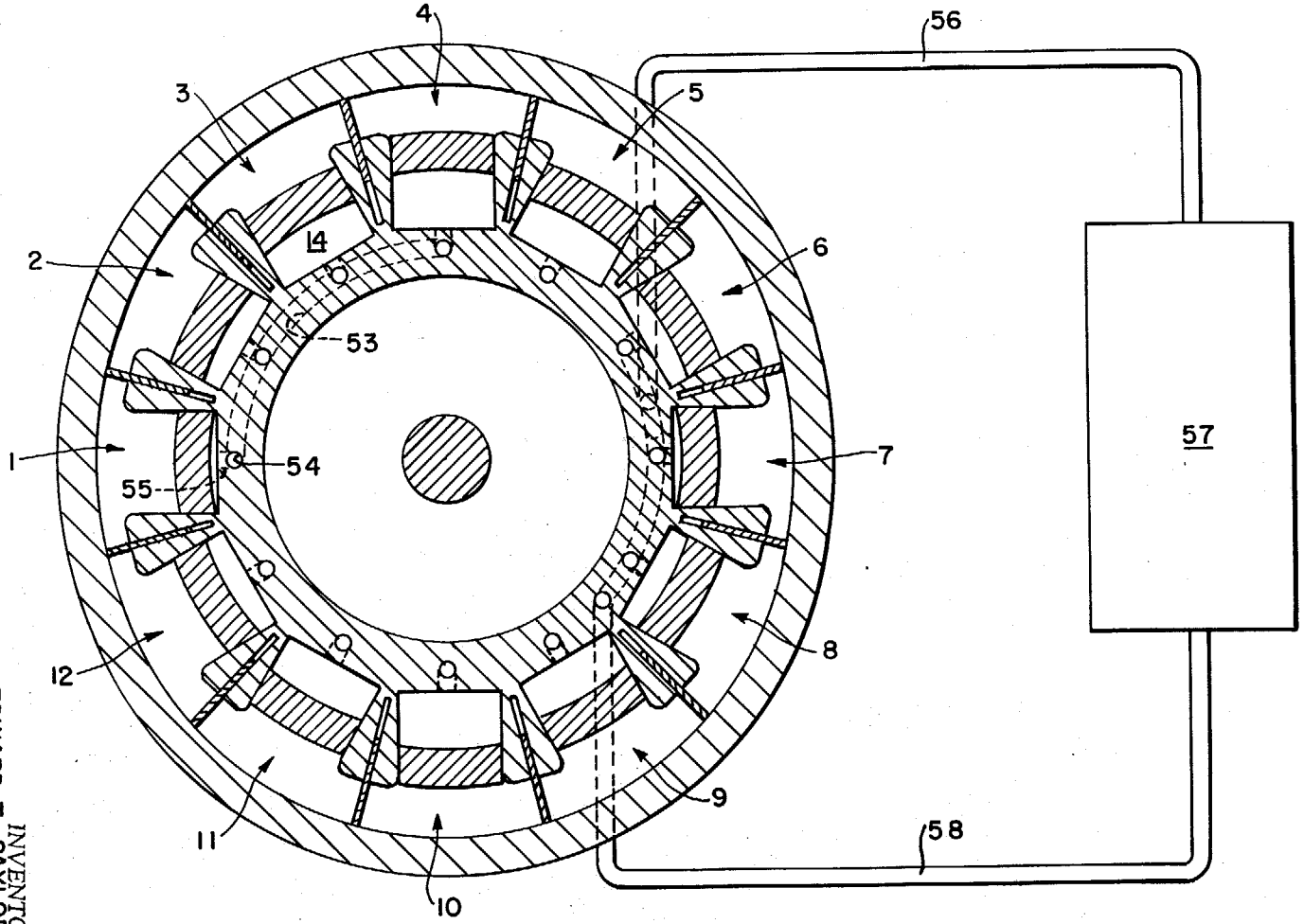
FIG. 8 is a fourth embodiment of [internal] combustion engine wherein a remotely fired combustion source is used.

In the final embodiment shown in FIG. 8, an externally fired combustion powered engine has been illustrated. In the embodiment depicted, gas is introduced at the appropriate slot 53 in an end plate (not shown) and through passages and ports 54, 55 into the compartment 14 which are in positions 1–4. Thereafter, relative movement of the rotor and casing will cause the compression of the gas until it is fully compressed at positions 6 and 7. At this point the gas will be permitted to escape by means of a passage 56 to a remote heating chamber 57. After heating, the hot gas will be returned through passage 58 into compartment 14 at positions 7 and 8. The expanding gas will then produce a torque from positions 7–10 to be followed by exhaust through positions 11–1. *It should be noted that gas introduced at position 1 is fully compressed at position 7. To this extent, the apparatus of FIG. 8 is a compressor, illustrating that the apparatus of the present invention could readily be adapted to serve this purpose.*

The engine is applicable to many different cycles because the engine displacement at any part of a cycle may be varied by the reshaping of the wall of the casing. For example, the change of volume during compression may be less than that during expansion so that the engine could function as a closed cycle Sterling engine. In other cycles the gas may be air or an air fuel mixture. A [smogless] *low pollution* engine could result if the compressed gas is ducted into the heating chamber at a relatively constant [velocity] *pressure* which in turn would produce a constant and efficient combustion. An air fuel mixture is burned directly in the heating chamber, but air if used as the compressed gas is first mixed with fuel injected into the heating chamber and is then burned. The increased gas volume after heating would provide the mechanical energy during the expansion cycle of the engine.

It will be understood that the foregoing description has related to particular embodiments of the invention and has therefore been merely representative. For example, instead of providing ignition means in the form of plugs as shown in the embodiment of FIG. 1, the motor may be fired relying upon autoignition solely due to compression of the fuel air mixture. Accordingly, in order to appreciate fully the spirit and scope of the present invention, reference should be made to the appended claims.

I claim:

1. A rotary [fluid motor] *apparatus* comprising:

(a) a casing having an inner and outer wall, said inner wall being of an approximately [circular] *elliptical* shape defined by points at non-uniform radial distances from a center [point], said points being located at angular displacements defined with respect to said center [point] and measured from a reference point in a direction of rotation, said inner wall being at [minimum] *maximum* radial distances from said center [point] at [minimum] points located at angular displacements of about 90° and about 270° from said reference point, said inner wall *being* at [maximum] *minimum* radial distances from said center [point being at maximum points located] at angular displacements of about 0° and 180° from said reference point, (b) a circular vaned wheel arranged within said casing for rotation about said center [point] in said direction of rotation and spaced from said inner wall, said wheel including a central hub and fixed vanes extending radially from said hub [at substantially uniform distances from said point], said fixed vanes forming channels adapted to accommodate a gas and a liquid in the form of a liquid cell adjacent to the inner wall and a gas cell adjacent to the central hub, a piston located in each channel slidably mounted therein to partition each channel into said gas and liquid cells, said fixed vanes and channels located at angular displacements defined with respect to said center [point] and measured from said reference point in said direction of rotation;

(c) movable vanes incorporated in said fixed vanes and extendable and retractable therefrom, means for urging said movable vanes into continuous contact with said inner wall to seal said channels,

[d. valve means for introducing a motive gas through gas port means within said central hub into said gas cells of said vaned wheel located at angular displacements of about 0° to about 90° from said reference point, said valve means further being adapted to close gas port means thereby sealing gas cells at angular displacements of about 90° to about 270° and said gas port means further adapted to allow the exhaust of said gas cells located at about angular displacements of about 270° to about 360°, end placed closing said casing and means for journaling said vaned wheel and central hub for rotation within said casing,]

(*d*) *end plates closing said casing and means for journalling said vaned wheel and central hub for rotation within said end plates,*

(e) means in conjunction with said casing and central hub for introducing a [motive] gas [through] *into* said central hub for passage into said cells located *at angular displacements of about 0° to 90°* [into each of said gas cells.]

(*f*) *valve means for introducing said gas through gas port means within said central hub into said gas cells of said vaned wheel located at angular displacements of about 0° to about 90° from said reference point, said valve means further being adapted to close gas port means thereby sealing gas cells at angular displacements of about 90° to about 270° and said gas port means further adapted to allow the exhaust of said gas from said gas cells located at about angular displacement of about 270° to about 360°,*

(*g*) *and means in conjunction with said casing and central hub for exhausting said gas cells at angular displacements of about 270° to about 360°.*

2. An apparatus according to claim 1 wherein said [motive] gas in (e) is capable of rapid expansion upon ignition and ignition means are provided for sequentially firing said gas in each cell after said gas has been compressed therein by relative rotation between said wheel and casing, in order to expand said ignited gas to drive said wheel relative to said casing.

3. An apparatus according to claim 2 in which said ignition means effects ignition solely by compression of said gas as a result of relative rotation between said casing and wheel.

4. An apparatus according to claim 2 in which said ignition means includes spark producing means and means for sequentially producing a spark in each gas cell after compression of gas therein.

5. An apparatus according to claim 4 in which said means (e), (f) and (g) includes poppet valves and camming means controlling the operation of said valves.

6. An apparatus according to claim 1 wherein said pistons under [(c)] (*b*) are of a material having a density intermediate that of said gas and liquid.

7. An apparatus according to claim 1 wherein said gas is [a combustible mixture] *air* and means are provided externally of said casing for receiving said gas from each cell at substantially maximum compression, means for *injecting fuel and for* firing said gas externally and means for returning said gas after combustion at increased energy to each cell to drive said wheel relative to said casing.

*8. An apparatus according to claim 1 wherein said gas is introduced under high pressure into a selected sequence of said gas cells to drive said wheel relative to said casing.*

*9. A rotary apparatus comprising:*

(*a*) *a casing having an inner and outer wall, said inner wall being of an approximately elliptical shape defined by points at non-uniform radial distances from a center, said points being located at angular displacements defined with respect to said center and measured from a reference point in a direction of rotation, said inner wall being at maximum radial distances from said center at points located at angular displacements of about 90° and about 270° from said reference point, said inner wall being at minimum radial distances from said center at angular displacements of about 0° and 180° from said reference point,*

(*b*) *a circular vaned wheel arranged within said casing for rotation about said center in said direction of rotation and spaced from said inner wall, said wheel*

*including a central hub and fixed vanes extending radially from said hub at substantially uniform distances from said center, said fixed vanes forming channels adapted to accommodate a gas and a liquid in the form of a liquid cell adjacent to the inner wall and a gas cell adjacent to the central hub, a piston located in each channel slidably mounted therein to partition each channel into said gas and liquid cells, said fixed vanes and channels located at angular displacements defined with respect to said center and measured from said reference point in said direction of rotation,*

*(c) movable vanes incorporated in said fixed vanes and extendable and retractable therefrom, means for urging said movable vanes into continuous contact with said inner wall to seal said channels,*

*(d) means in conjunction with said casing and central hub for introducing a gas into said central hub for passage into selected sequentially related cells wherein said gas is compressed during relative rotation between said wheel and casing and means for exhausting said gas from said cells and casing after said gas has been compressed in said selected sequence of cells.*

*10. A rotary apparatus comprising:*

*(a) a casing having an inner and outer wall, said inner wall being defined by points at non-uniform radial distances from a center, said points being located at angular displacements defined with respect to said center and measured from a reference point in a direction of rotation, said inner wall being at sequentially related maximum and minimum distances from said center,*

*(b) a circular vaned wheel arranged within said casing for rotation about said center in said direction of rotation and spaced from said inner wall, said wheel including a central hub and fixed vanes extending radially from said hub at substantially uniform radial distances from said center, said fixed vanes forming channels adapted to accommodate a fluid and a liquid in the form of a liquid cell adjacent to the inner wall and a fluid cell adjacent to the central hub, a piston located in each channel slidably mounted therein to partition each channel into said fluid and liquid cells, said fixed vanes and channels located at angular displacements defined with respect to said center and measured from said reference point in said direction of rotation.*

*11. The apparatus according to claim 7 wherein means including intake and exhaust means are provided for returning said gas after combustion to a selective sequence of cells to drive said wheel within said casing.*

References Cited

The following references, cited by the Examiner, are of record in the patented file of this patent or the original patent.

UNITED STATES PATENTS

| | | | |
|---|---|---|---|
| 2,052,492 | 8/1936 | Seibold | 123—8.45 |
| 2,771,860 | 11/1956 | Falk | 123—8.45 X |
| 1,094,919 | 4/1914 | Nash | 60—12 |
| 1,603,613 | 10/1926 | Lee | 60—12 |

FOREIGN PATENTS

| | | | |
|---|---|---|---|
| 588,234 | 7/1932 | Germany | 123—16 |
| 679,329 | 9/1952 | Great Britain | 123—16 |

C. J. HUSAR, Primary Examiner

M. KOCZO, Jr., Assistant Examiner

U.S. Cl. X.R.

91—197; 123—8.45, 19, 44 R; 417—462